(12) United States Patent
Smith et al.

(10) Patent No.: US 8,380,413 B2
(45) Date of Patent: Feb. 19, 2013

(54) METHOD AND SYSTEM FOR RAIL VEHICLE CONTROL

(75) Inventors: Eugene A. Smith, Melbourne, FL (US); Todd Goodermuth, Satellite Beach, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/555,361

(22) Filed: Jul. 23, 2012

(65) Prior Publication Data
US 2013/0018560 A1    Jan. 17, 2013

Related U.S. Application Data

(63) Continuation of application No. PCT/US2012/046896, filed on Jul. 16, 2012.

(60) Provisional application No. 61/508,059, filed on Jul. 14, 2011.

(51) Int. Cl.
*G06F 7/70* (2006.01)

(52) U.S. Cl. .............. 701/70; 701/36; 701/19; 701/83; 246/94; 246/187 C

(58) Field of Classification Search .............. 701/19, 701/20, 36, 70, 83, 117; 180/168; 318/587; 246/7, 94, 166.1, 187 C
See application file for complete search history.

(56) References Cited

U.S. PATENT DOCUMENTS

| | | | |
|---|---|---|---|
| 3,745,933 A | 7/1973 | Eisele et al. | |
| 3,891,965 A | 6/1975 | Schroeder | |
| 4,344,364 A | 8/1982 | Nickles et al. | |
| 4,735,385 A | 4/1988 | Nickles et al. | |
| 5,289,378 A | 2/1994 | Miller et al. | |
| 5,293,632 A | 3/1994 | Novakovich et al. | |
| 5,317,751 A | 5/1994 | Novakovich et al. | |
| 5,339,782 A * | 8/1994 | Golzer et al. | 123/399 |
| 5,342,120 A * | 8/1994 | Zimmer et al. | 303/113.2 |
| 5,353,413 A | 10/1994 | Novakovich et al. | |
| 5,530,328 A | 6/1996 | Fernandez et al. | |
| 5,581,472 A | 12/1996 | Miller et al. | |
| 5,630,565 A | 5/1997 | Lumbis | |
| 5,636,907 A * | 6/1997 | Okazaki et al. | 303/10 |
| 5,681,015 A | 10/1997 | Kull | |
| 5,787,371 A | 7/1998 | Balukin et al. | |
| 5,928,294 A * | 7/1999 | Zelinkovsky | 701/24 |
| 6,032,905 A | 3/2000 | Haynie | |
| 6,163,089 A | 12/2000 | Kull | |
| 6,203,343 B1 | 3/2001 | Chevassus-More et al. | |
| 6,217,126 B1 | 4/2001 | Kull | |
| 6,225,919 B1 | 5/2001 | Lumbis et al. | |
| 6,229,452 B1 | 5/2001 | Kull | |
| 6,283,765 B1 | 9/2001 | Lumbis et al. | |
| 6,330,499 B1 | 12/2001 | Chou et al. | |
| 6,435,624 B1 | 8/2002 | Kull et al. | |
| 6,582,031 B2 | 6/2003 | Newton et al. | |
| 6,759,871 B2 | 7/2004 | Nguyen et al. | |

(Continued)

*Primary Examiner* — Gertrude Arthur Jeanglaude
(74) *Attorney, Agent, or Firm* — GE Global Patent Operation; John A. Kramer

(57) ABSTRACT

A system comprises a control module that is configured for operable coupling with at least one of a brake system and/or a penalty detection system of a first vehicle. The control module is further configured to operate in a first mode of operation. In the first mode of operation, the control module activates the brake system, responsive to receiving a first control signal from a second vehicle; the first and second vehicles are coupled in a consist. Alternatively or additionally, the control module is configured to operate in a second mode of operation. In the second mode of operation, the control module is configured to generate the first control signal for transmission to the second vehicle and activation of a brake system of the second vehicle, responsive to receiving a second control signal from the penalty detection system.

23 Claims, 4 Drawing Sheets

U.S. PATENT DOCUMENTS

| | | |
|---|---|---|
| 6,839,664 B1 | 1/2005 | Kull |
| 6,980,127 B2 | 12/2005 | Lumbis et al. |
| 7,004,550 B2 | 2/2006 | Root et al. |
| 7,021,588 B2 | 4/2006 | Hess et al. |
| 7,029,076 B2 | 4/2006 | Root et al. |
| 7,069,123 B2 | 6/2006 | LaPointe |
| 7,494,194 B2 | 2/2009 | Higgs et al. |
| 7,532,604 B2 | 5/2009 | Eglin |
| 7,618,011 B2 | 11/2009 | Oleski et al. |
| 7,673,568 B2 | 3/2010 | Marra et al. |
| 2001/0044681 A1 | 11/2001 | Diana et al. |
| 2002/0087578 A1 | 7/2002 | Vroman |
| 2002/0186670 A1 | 12/2002 | Fuster et al. |
| 2003/0009274 A1 | 1/2003 | Peterson et al. |
| 2003/0034423 A1 | 2/2003 | Hess et al. |
| 2003/0087543 A1 | 5/2003 | Hess et al. |
| 2003/0151520 A1 | 8/2003 | Kraeling et al. |
| 2003/0213875 A1 | 11/2003 | Hess et al. |
| 2004/0084957 A1 | 5/2004 | Root et al. |
| 2004/0104312 A1 | 6/2004 | Hess et al. |
| 2005/0254818 A1 | 11/2005 | Zhou et al. |
| 2006/0025903 A1 | 2/2006 | Kumar |
| 2006/0085103 A1 | 4/2006 | Smith et al. |
| 2006/0138285 A1 | 6/2006 | Oleski et al. |
| 2006/0180709 A1 | 8/2006 | Breton et al. |
| 2007/0173989 A1 | 7/2007 | Walker |
| 2008/0112473 A1 | 5/2008 | Refaeli et al. |
| 2008/0159281 A1 | 7/2008 | Jesseph |
| 2009/0157360 A1 | 6/2009 | Ye et al. |
| 2010/0034298 A1 | 2/2010 | Takahashi et al. |

\* cited by examiner

METHOD AND SYSTEM FOR RAIL VEHICLE CONTROL

CROSS REFERENCE

This application is a continuation of International Application No. PCT/US12/46896, filed Jul. 16, 2012, which claims the benefit of U.S. Provisional application No. 61/508,059, filed Jul. 14, 2011.

FIELD OF THE INVENTION

Embodiments of the invention relate to vehicles. Other embodiments relate to systems for controlling rail vehicles and other vehicles.

BACKGROUND

In certain rail vehicles, e.g., locomotives, the rail vehicle is outfitted with an on-board safety system for automatically controlling the train upon the occurrence of one or more designated events. For example, in a positive train control (PTC) system, if a rail vehicle violates a wayside signal (such as passing through a red aspect signal), a signal is transmitted to the rail vehicle, with an on-board system automatically applying the brakes of the rail vehicle in response to receiving the signal.

However, if the safety system fails, the rail vehicle may be unable to properly respond to occurrences of the designated events. Additionally, in many systems, the rail vehicle may be automatically controlled to a fault control state if the on-board system fails. For example, in some systems, the brake system of the rail vehicle is automatically applied for bringing the rail vehicle to a stop, for safety purposes.

For systems where the rail vehicle is still mobile even after the on-board safety system has failed, this may result in unsafe operating conditions. Additionally, for systems where the rail vehicle is brought to a halt after the safety system fails, this results in blocked tracks, vehicle downtime, and the like.

Other vehicle systems may be configured to operate similarly. For example, consists of non-rail off highway vehicles may have on-board safety systems for automatically braking the consist for safety purposes upon the occurrence of designated events. If the on-board safety system on one of the vehicles fails, it may be the case that the consist is automatically braked to as a fault control state.

It may be desirable to have a vehicle control system (e.g., safety related control) that differs in aspects or functionality from currently available vehicle control systems.

BRIEF DESCRIPTION

In an embodiment, a system comprises a control module. The control module is configured for operable coupling with at least one of a brake system and/or a penalty detection system of a first vehicle, e.g., a first rail vehicle. The control module is further configured to operate in a first mode of operation. In the first mode of operation, the control module activates the brake system, responsive to receiving a first control signal from a second vehicle, e.g., a second rail vehicle; the first and second vehicles are coupled in a consist. Alternatively or additionally, the control module is configured to operate in a second mode of operation. In the second mode of operation, the control module is configured to generate the first control signal for transmission to the second vehicle and activation of a brake system of the second vehicle, responsive to receiving a second control signal from the penalty detection system. The control module may be further configured, in the first mode of operation, to deactivate the brake system responsive to receiving a third control signal relating to a failure condition of the penalty detection system (e.g., the brake system may be activated by the penalty detection system upon occurrence of the failure condition, as a fault control state, and the control module subsequently controls deactivating the brake system).

In another embodiment, a system comprises a first control module operably coupled with a first brake system of a first vehicle (e.g., a first rail vehicle) and a first penalty detection system of the first vehicle. The system further comprises a second control module operably coupled with a second brake system of a second vehicle (e.g., a second rail vehicle) and a second penalty detection system of the second vehicle. The first and second vehicles are coupled together in a consist. The first control module is configured to activate the first brake system responsive to receiving a first control signal from the second control module. The second control module is configured to transmit the first control signal to the first control module responsive to receiving a second control signal from the second penalty detection system.

Another embodiment relates to a method for controlling a vehicle consist. The method comprises receiving a first control signal at a first vehicle (e.g., a first rail vehicle) in the consist from a second vehicle (e.g., a second rail vehicle) in the consist, and activating a brake system of the first vehicle responsive to the first control signal when a first penalty detection system of the first vehicle is in a failure condition. In another embodiment, the method further comprises, prior to receiving the first control signal and activating the brake system, and responsive to the failure condition of the first penalty detection system of the first vehicle, deactivating the brake system of the first vehicle.

BRIEF DESCRIPTION OF THE DRAWINGS

The invention may be described and understood from reading the following description of non-limiting embodiments, with reference to the attached drawing(s).

DETAILED DESCRIPTION

Figure 1:
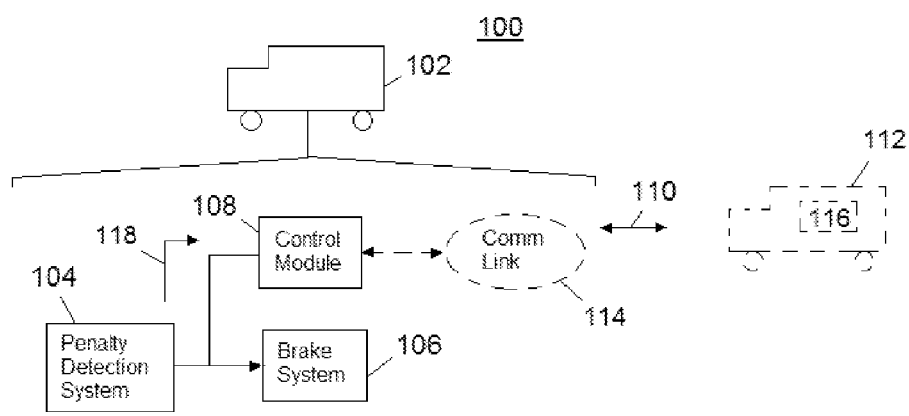
FIG. 1 is a schematic diagram of a system for vehicle control, according to an embodiment of the invention.

Embodiments of the invention relate to systems and methods for controlling a vehicle consist (e.g., a rail vehicle consist). In the system, first and second vehicles (e.g., first and second rail vehicles) of a vehicle consist (e.g., rail vehicle consist) each include a respective brake system and a respective penalty detection system, e.g., the brake and penalty detection systems may be existing equipment. In each vehicle, the penalty detection system is operable to activate the brake system upon the occurrence of one or more designated events. The designated event(s) may be on-board events, or off-board events, or events relating to the interaction between the vehicle and its external environment, e.g., relative to a rail signaling system. In the case of on-board events, the penalty detection system receives information of the event (e.g., by way of a signal relating thereto), and in response activates the brake system of the vehicle. In the case of off-board events, the penalty detection system receives information of the event (e.g., by way of a signal relating thereto), and in response activates the brake system of the vehicle. The information/signal may be received wirelessly or otherwise from a source that is off board the consist. For activating the brake system, as one example, the brake system may have an input, wherein when the input is at a designated first voltage level (e.g., positive voltage level) the brake system is deactivated (deactivated at least by way of this particular input), and when the input is at a designated second voltage level (e.g., zero or other voltage level lower than the first voltage level), the brake system is activated. Thus, the penalty detection system may be configured to switch the input to the second voltage level (e.g., a low or zero voltage level), upon occurrence of a designated event.

Further in the system, each rail vehicle or other vehicle includes a respective control module operably coupled with the brake system and/or the penalty detection system of the vehicle. The control modules are configured to communicate with one another over a communication link/channel, such as a wireless channel, or over a train line or other conductor coupling the first and second vehicles in the consist. "Consist" refers to plural vehicles (e.g., rail vehicles) that are mechanically coupled together to travel along a route; a train is one example of a rail vehicle consist. In normal operation of the vehicle consist, in the case where the first vehicle is designated as a lead vehicle of the consist (meaning primarily in control of an air brake system or other brake system of the consist that interconnects the vehicles of the consist, and/or primarily in control of other intra-consist control functions, such as distributed power or other coordinated multi-vehicle traction control), the consist travels along a track or other route, and when the penalty detection system of the first vehicle is triggered (upon the occurrence of a designated event), the penalty detection system activates the brake system of the first vehicle, which in turn (in some embodiments) activates the brake system of the second vehicle. For example, in the case of a rail vehicle air brake system, activation of the air brake system on the lead vehicle will typically cause the air brakes on all other rail cars of the consist to also activate. If the penalty detection system of the first vehicle enters a failure condition (a designated condition indicative of the penalty detection system being non-operational or otherwise not operating within designated parameters), the penalty detection system activates the brake system of the first vehicle (at least in some embodiments), e.g., the penalty detection system fails to maintain the input of the brake system at a designated high voltage level or other first voltage level. Alternatively, in other types of vehicles, it may be the case that the penalty detection system fails to operate, without causing the brake system to activate. (In other words, in such a system, the vehicle could continue to operate, but would not be braked in response to the occurrence of a designated event that would otherwise trigger the penalty detection system if it was operating within designated parameters.)

Upon the penalty detection system of the first vehicle entering a failure condition, the control modules of the first and second vehicles are activated. Activation may be automatic, or it may be manual. In either case, when the control modules are active, the control module of the first vehicle initiates a brake system clearing function, if needed. Specifically, if the brake system of the first vehicle is activated, such as due to a zero voltage level or other second voltage level at the input of the brake system, the control module of the first vehicle deactivates the brake system, such as by bringing the input to a designated high voltage or other first voltage level. Subsequently, the consist may be operated as normal. However, the penalty detection system and control module of the second vehicle are active, and the penalty detection system is able to receive control inputs (e.g., wireless signals) indicative of designated events. Upon the occurrence of a designated event, the penalty detection system of the second vehicle generates a control signal. For example, the control signal may be the signal that the penalty detection system would normally generate for activating the brake system of the second vehicle. This signal is received by the control module of the second vehicle, and the control module transmits the signal (or a signal relating thereto) to the control module of the first vehicle. The control module of the first vehicle in turn, and responsive to receiving the signal, activates the brake system of the first vehicle. Depending on the type of brake system in question, this may result in activation of the brakes of the entire consist.

Whereas failure of a penalty detection system on board a lead rail vehicle of a consist (for example) would normally result in lengthy braking of the consist, in embodiments of the invention, the penalty detection function is in effect shunted to a second vehicle in the consist, with the second vehicle in turn communicating the information of the penalty detection function to the first vehicle, for subsequent operation of the first vehicle as if the penalty detection system of the first vehicle were still operational. The consist can continue operating as normal, until the first vehicle is later serviced.

Switching between modes of the aforementioned systems (such as activating the control modules subsequent to failure of a penalty detection system) may be realized by appropriately wiring electrical sub-systems of the vehicle to a manual dial and/or set of switches. In such a case, when the penalty detection system fails, an operator of the consist actuates the dials or other controls of the first and second vehicles, to activate the control modules, the viable penalty detection system, communication links (e.g., cab signal), and so on. Alternatively, switching may be automatic.

To facilitate consistency of explanation, the drawings illustrate embodiments of the invention mostly in the context of rail vehicles. However, the indicated embodiments are applicable to other types of vehicles and vehicle consists.

FIG. 1 illustrates an embodiment of a control system 100, as deployed on a first rail vehicle 102 of a rail vehicle consist. The first rail vehicle 102 includes a penalty detection system 104 and a brake system 106, e.g., an air brake system. A first control module 108 is operably coupled with the brake system 106 and penalty detection system 104, e.g., the control module may be electrically coupled to an output of the penalty detection system and an input of the brake system. ("Module" refers to a distributed or unitary system having electronic equipment components and/or software components, software referring to one or more sets of non-transient instructions, stored on a tangible medium, that can be accessed by electronic equipment and when so accessed and executed by the electronic equipment, cause the electronic equipment to perform one or more designated functions according to the contents of the instructions.) The first control module 108 is configured to operate in at least first and second modes of operation. When the first control module 108 is active for operation in the first mode of operation, the first control module is configured to activate the brake system 106 of the first rail vehicle 102, responsive to receiving a first control signal 110 from a second rail vehicle 112 of the rail vehicle consist over a communication link ("Comm Link") 114. ("Activate" the brake system includes generating signals for activating the brake system, e.g., signals communicated to a vehicle control system or braking control system, and not necessarily that the control module directly causes vehicle braking.) When the first control module 108 is active for operation in the second mode of operation, the first control module is configured to generate the first control signal 110 for transmission to the second rail vehicle 112 for activation of a brake system 116 of the second rail vehicle, responsive to receiving a second control signal 118 from the penalty detection system 104. In another embodiment, the first control module 108 is configured to additionally operate in a third mode of operation, namely, an inactive mode. This refers to a mode in which the first control module performs the functions of neither the first mode of operation nor the second mode of operation, but is instead in a standby condition, power off condition, or other inactive condition or state from which the first control module can be selectively or otherwise re-activated in regards to the first and second modes of operation. The inactive mode may include continued operation in the second mode when the control module is selected for operation in the second mode, but in embodiments, the inactive mode at least includes not performing the function(s) of the first mode of operation. That is, in the case where the control module is deployed on a designated trail rail vehicle, if the penalty detection system of the lead rail vehicle of the consist is operating normally, then it is irrelevant if the control module continues to generate control signals, as long as those signals are not acted upon on board the lead rail vehicle. Thus, if the control module is deployed on the lead rail vehicle, and the penalty detection system of the lead rail vehicle is operating normally, then the control module may be configured not to react responsive to receiving control signals from the trail rail vehicle.

As noted above, a vehicle that is designated as a lead vehicle of a consist is primarily in control of a brake system (e.g., air brake system) of the consist that interconnects the vehicles of the consist, and/or is primarily in control of other intra-consist control functions, such as distributed power or other coordinated multi-vehicle traction control. The lead vehicle may be the first vehicle in line, but this is not necessarily the case. Usually, there is only one lead vehicle in a consist. Thus, a trail vehicle is a vehicle in a consist that is not designated as the lead vehicle, and that is not primarily in charge of the control functions that the lead vehicle is.

In an embodiment of the control system 100, the current mode in which the first control module 108 operates is selected automatically by the control module 108 (e.g., based on received signals and/or on operating conditions of the first rail vehicle). In another embodiment of the control system 100, as discussed in more detail below, the current mode in which the first control module 108 operates is selected manually. In yet another embodiment, the control system 100 is configured for both automatic and manual selection, e.g., manual selection with automatic override under designated circumstances, or automatic selection with manual override. In one aspect, in the example of the first control module 108 deployed on board the first rail vehicle 102, the third mode of operation (inactive mode of operation of the first control module) is selected if the first rail vehicle is designated for operation as the lead rail vehicle of the consist, and if the penalty detection system 104 is operating normally, meaning operating within designated parameters for performing penalty detection functions. Here, the penalty detection system 104 works as discussed above in regards to normal operation of the penalty detection system. For example, the penalty detection system 104 of the first rail vehicle 102 will activate the brake system 106, such as an air brake system of the consist, upon the occurrence of one or more designated events, such as receiving a safety-related signal or other designated consist control signal from off board the consist.

In another aspect, the first mode of operation may be selected, for example, when the first rail vehicle 102 is designated for operation as the lead rail vehicle of the consist, and the penalty detection system 104 of the first rail vehicle 102 has entered a failure condition. Here, the first control module 108 activates the brake system 106 of the first rail vehicle responsive to receiving the first control signal 110 from the second rail vehicle 112 in the consist. Thus, the second rail vehicle 112 performs the penalty detection function and communicates the first control signal to the first rail vehicle for activation of the brake system of the first rail vehicle, e.g., a common air brake of the consist. In another aspect, the second mode of operation may be selected, for example, when the first rail vehicle 102 is designated for operation as a trail rail vehicle of the consist, i.e., it is not designated as the lead rail vehicle of the consist, and a penalty detection system of the lead rail vehicle has entered a failure condition. That is, the first rail vehicle 102 performs the penalty detection function and communicates the first control signal 110 to the lead rail vehicle for activation of the brake system of the lead rail vehicle, e.g., a common air brake of the consist. Thus, the mode of operation of the control module may be selected based on whether the rail vehicle in which the control module is deployed is designated for operation as a lead rail vehicle or a trail rail vehicle of the consist, and whether the penalty detection system of the lead rail vehicle is operating normally (is not in a failure condition).

As noted above, "failure condition" refers to a designated condition indicative of a penalty detection system being non-operational or otherwise not operating within designated parameters. "Failure state," "fail," "has failed," and similar variants are used synonymously. According to embodiments of the control system, determinations of a failure condition can be based on the absence of a signal normally present when the penalty detection system is operating normally, presence of a signal generated by the penalty detection system upon entering a failure condition, periodic diagnostics, or the like. Alternatively or additionally, a failure condition can be determined manually by a human operator, and the control system activated and set to a particular mode of operation based on manual positioning of a switch or set of set of switches, as discussed further below.

Figure 2:
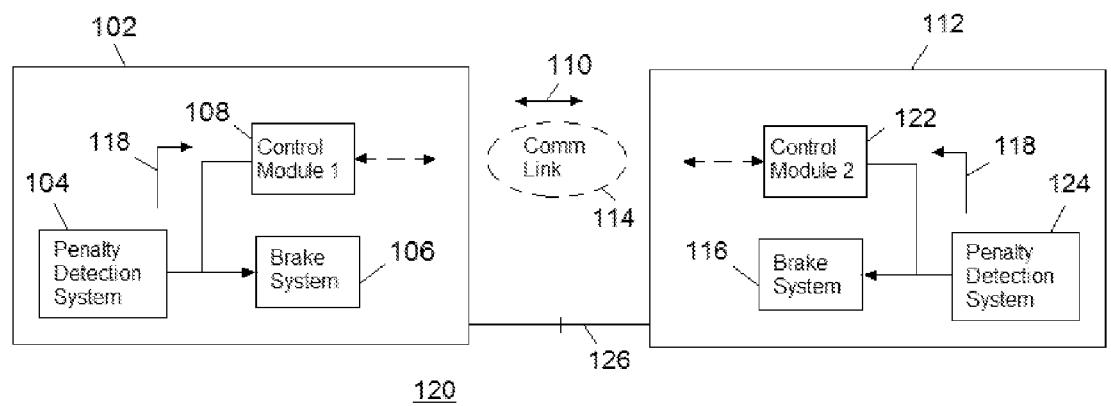
FIG. 2 is a schematic diagram of another embodiment of a system for vehicle control.

FIG. 2 shows another embodiment of a control system 120. The control system 120 comprises the first control module 108 ("Control Module 1") on board the first rail vehicle 102, and a second control module 122 ("Control Module 2") on board a second rail vehicle 112. The first control module 108 is operably coupled with the brake system 106 and the first penalty detection system 104 of the first rail vehicle 102. The second control module 122 is operably coupled with the brake system 116 and a second penalty detection system 124 of the second rail vehicle 112. The first and second rail vehicles are coupled together in a consist, either directly or indirectly, e.g., directly via a coupler 126, or through intervening rail vehicles. The control modules 108, 122 are configured to communicate over the communication link 114. In embodiments, the control modules 108, 122 are both configured to operate as described above in reference to FIG. 1, that is, each control module 108, 122 is controllable to operate in the first mode, the second mode, and the third/inactive mode. According to one aspect, when the first rail vehicle 102 is designated for operation as the lead rail vehicle in the consist (with the second rail vehicle 112 thereby being a trail rail vehicle), but with the penalty detection system 104 of the first rail vehicle 102 being normally operative (not in a failure condition), the first control module 108 and the second control module 122 may be selected for operation in the inactive mode. When the first rail vehicle 102 is designated for operation as the lead rail vehicle in the consist (with the second rail vehicle 112 thereby being a trail rail vehicle), and the penalty detection system 104 of the first rail vehicle 102 enters a failure condition, the first control module 108 may be selected for operation in the first mode of operation, and the second control module 122 may be selected for operation in the second mode of operation. Here, the second control module 122 generates the first control signal 110 for transmission to the first rail vehicle 102 for activation of the brake system 106 of the first rail vehicle, responsive to receiving a second control signal 118 from the penalty detection system 124 of the second rail vehicle 112. Responsive to receiving the first control signal 110 from the second control module 122, the first control module 108 activates the brake system 106 of the first rail vehicle 102.

Similarly, when the second rail vehicle 112 is designated for operation as the lead rail vehicle in the consist (with the first rail vehicle 102 thereby being a trail rail vehicle), but with the penalty detection system 124 of the second rail vehicle 112 being normally operative (not in a failure condition), the first control module 108 and the second control module 122 may be selected for operation in the inactive mode. When the second rail vehicle 112 is designated for operation as the lead rail vehicle in the consist (with the first rail vehicle 102 thereby being a trail rail vehicle), and the penalty detection system 124 of the second rail vehicle 112 enters a failure condition, the second control module 122 may be selected for operation in the first mode of operation, and the first control module 108 may be selected for operation in the second mode of operation. Here, the first control module 108 generates the first control signal 110 for transmission to the second rail vehicle 112 for activation of the brake system 116 of the second rail vehicle, responsive to receiving a second control signal 118 from the penalty detection system 104 of the first rail vehicle 102. Responsive to receiving the first control signal 110 from the first control module 108, the second control module 122 activates the brake system 116 of the second rail vehicle 112.

For selection of particular modes of operation of the first and second control modules, the first control module 108 and the second control module 122 may be configured to communicate with one another over the communication link 114, and to act responsive to the communications. For example, the control modules 108, 122 may each be configured such that if the control module is deployed on board a rail vehicle that is designated for operation as the lead rail vehicle of the consist, and the penalty detection system of the lead rail vehicle enters a failure condition, the control module communicates with the control module(s) on board the trail rail vehicle(s), according to a designated communication protocol, with the control module on board the trail rail vehicle switching to the second mode of operation responsively (e.g., the control module of the trail rail vehicle subsequently communicates the first control signal 110 to the lead rail vehicle responsive to receiving the second control signal 118 from the penalty detection system of the trail rail vehicle). Communications between the rail vehicles, such as between the control modules or otherwise, may be utilized to activate the penalty detection system of the trail rail vehicle, if doing so is needed, when the penalty detection system of the lead rail vehicle enters a failure condition.

According to another aspect, in the case where the first rail vehicle 102 (for example) is the designated lead rail vehicle, when the penalty detection system 104 of the first rail vehicle 102 enters a failure condition, the brake system 106 is automatically activated. Brake activation at the onset of a failure condition may be a feature of the penalty detection system 104 and/or brake system 106, e.g., the vehicle is stopped or otherwise braked, as a fault control state, because further operation with the penalty detection system in a failure condition may result in unsafe conditions. In embodiments, the first control module 108 is configured so that upon its activation in the first mode of operation, the control module 108 deactivates the brake system 106, if needed. Additionally, the second control module 122 and penalty detection system 124 of the second, trail rail vehicle are activated. Subsequently, if the penalty detection system 124 is triggered due to the occurrence of a designated event, it outputs the second control signal 118 to the brake system 116 of the second rail vehicle 112. This signal 118 is read/received by the second control module 122, by virtue of the second control module being connected to the same electrical line as the input of the brake system 116, for example. The brake system 116 is not activated, since it is not in the designated lead rail vehicle. The second control module 122 transmits the first control signal 110 to the first control module 108, over the communication link 114, which in turn activates the brake system 106.

In embodiments, the control modules 108, 122 are deployed on rail vehicles 102, 112 or other vehicles that share a common air brake system when the vehicles are coupled in a consist. That is, each vehicle 108, 122 includes a respective brake system 106, 116, and the brake systems 106, 116 are air brake systems that are linked together when the vehicles are coupled in consist. The common air brake system is primarily controlled (e.g., activated) by the designated lead rail vehicle of the consist. Thus, when the penalty detection system of the lead rail vehicle enters a failure condition, the penalty detection function is performed by a trail rail vehicle, with the control module of the lead rail vehicle acting in the first mode of operation responsive to control signals received from the control module of the trail rail vehicle, to activate the air brake system. The brake system of the trail rail vehicle is activated due to activation of the common air brake system on the lead rail vehicle, but the air brake system is not activated on board the trail rail vehicle responsive to the penalty detection system of the trail rail vehicle. That being said, embodiments of the invention are applicable to vehicles having independent brake systems. For example, if the first and second rail vehicles or other vehicles have independent brake systems, and if the penalty detection system of the first rail vehicle enters a failure condition, then it could be the case that upon the occurrence of a designated event (for the penalty detection system to initiate braking), the penalty detection system of the second rail vehicle would activate the brake system of the second rail vehicle, the control module of the second rail vehicle would communicate the first control signal to the control module of the first rail vehicle (responsive to a second control signal received from the penalty detection system of the second rail vehicle), and the control module of the first rail vehicle would responsively activate the brake system of the first rail vehicle.

Figure 3:
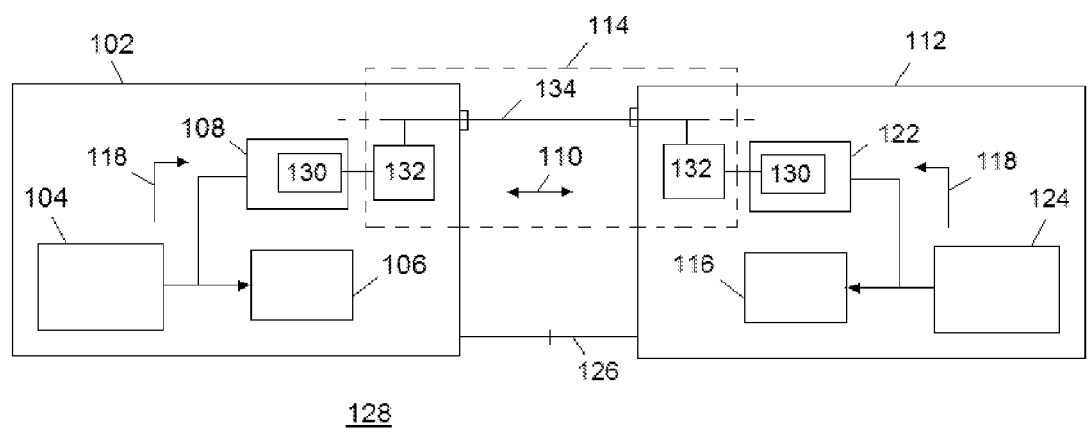
FIG. 3 is a schematic diagram of another embodiment of a system for vehicle control.

The communication link 114 may be wireless (e.g., dedicated channel and/or wireless transmission equipment, communications over a wireless distributed power link, or the like) or wired (e.g., communications over a wired distributed power line, or over an electronically controlled pneumatic/ECP brake line). In embodiments, the control modules 108, 122 may be configured for network communications over a data network (e.g., Ethernet network) on board the consist, that is, the communication link 114 is an Ethernet or other data network link. One such embodiment is shown in FIG. 3. Here, a control system 128 includes control modules 108, 122 for deployment on rail vehicles 102, 112. Each control module 108, 122 includes a respective Ethernet or other data network communication unit 130 (e.g., input/output port, circuitry for Ethernet communications over the input/output port) for communicating Ethernet or other network data (data that is packaged in packet form as data packets). Additionally, the vehicles 102, 112 are outfitted with respective router transceiver units 132 for Ethernet or other data network communications over a train line or other conductor(s) 134 coupling the first and second rail vehicles in the consist. For example, the conductor may be a line for supplying electrical power, or an MU cable bus (multiple unit cable bus), which is an electrical bus interconnecting the rail vehicles in the consist for communication of non-network control information in the consist (non-network control information referring to data or other information, used in the consist for control purposes, which is not Ethernet or other packet data). The router transceiver units 132 are each electrically coupled to the conductor(s) 134. The router transceiver units are configured to transmit and/or receive network data over the conductor(s) 134. For example, each router transceiver unit may be configured to convert network data into modulated network data for transmission over the conductor(s) 134, and to de-modulate modulated network data received over the conductor(s) back into network data. If the modulated network data is transmitted over the conductor(s) that also is used to communicate non-network control information, then the router transceiver units may be configured to generate the modulated network data orthogonal to the non-network control information transferred. Alternatively, the network data may be communicated over otherwise unused conductors, or over dedicated conductors.

The data network communication units 130 of the control modules 108, 122 are connected to the router transceiver units 132 with appropriate cabling (e.g., Ethernet cables/bus). In operation, for example, when the first control module communicates a control signal 110 or other signal to the second control module (or vice versa), the control signal is output by the data network communication unit 130 of the first control module as Ethernet or other network data. The network data is received by the router transceiver unit connected to the first control module, and the router transceiver unit modulates it into modulated network data for communication over the inter-vehicle conductor(s) 134. The modulated network data is received at the router transceiver unit of the rail vehicle of the second control module, de-modulated back into network data, and communicated from the router transceiver unit to the data network communication unit of the second control module.

Further details about suitable router transceiver units can be found in commonly assigned U.S. Publication No. 20100241295, dated Sep. 23, 2010, which is hereby incorporated by reference herein in its entirety.

Figure 4:
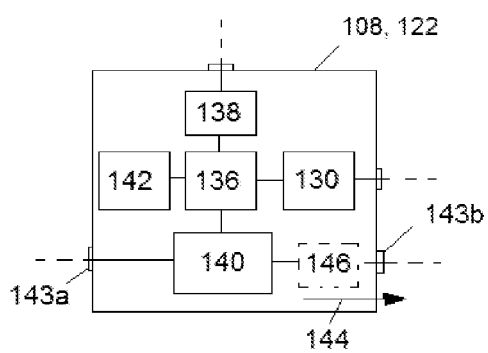
FIG. 4 is a schematic diagram of a control module portion of the system for vehicle control, according to an embodiment.

FIG. 4 shows an embodiment of the control modules 108, 122 in more detail. In this embodiment, the control module 108, 122 comprises a controller (e.g., microprocessor) 136, a power supply 138, a data network communication unit 130 (which can be standalone or an integrated part of the controller), and a brake control input/output unit 140. If applicable, the control module 108, 122 may further include a memory 142 for storing non-transient instructions that are accessible and executed by the controller 136. (The memory 142 is shown separate from the controller, but may be an integrated part of the controller.) The power supply 138 receives electrical power from a source off board the control module, via an electrical power bus or the like, and may be configured to convert the received electrical power into different electrical power waveforms (e.g., voltage levels) if needed. The control module includes internal distribution lines (only one is shown, connected to the controller) for internal distribution of electrical power as needed. The controller is operably connected to the data network communication unit, for network communications as described above. The controller is also operably connected to the brake control input/output unit. The brake control input/output unit includes one or more input/output ports/lines, and electrical circuitry connected to the input/output ports/lines, which are configured to: (i) receive information/signals from a penalty detection system through a first port/line 143a (e.g., if operating in the second mode, the control module may generate control signals 110 responsive to receiving such information/signals that indicate occurrence of a designated event for initiating braking); and (ii) under control of the controller, output third control signal(s) 144 over a second port/line 143b for activating the brake system 106, 116. For example, the signal/information received from the penalty detection system may be a two-level voltage signal, with a first of the two voltage levels (e.g., a high voltage level) of the signal being designated as indicating no penalty condition (a designated event has not occurred) and a second of the two voltage levels (e.g., zero or low voltage level) of the signal being designated as indicating a penalty condition (a designated event for initiating braking has occurred). As another example, the third control signal 144 may be configured to activate a relay 146, which when activated applies a voltage to a brake system control input for activating the brake system.

Figure 5:
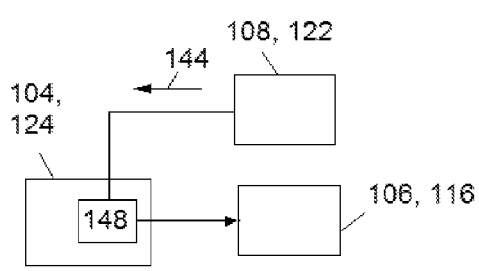
FIG. 5 is a schematic diagram of another embodiment of a system for vehicle control.

Although the control modules 108, 122 are shown in some of the figures as connected to the brake systems 106, 116, in embodiments, the control modules are connected to activate the brake system through the penalty detection system. For example, as shown in FIG. 5, the penalty detection system 104, 124 may include an electrically actuated valve (or other brake system control element) 148 for activating the brake system. The control module 108, 122 is connected to the electrically actuated valve or other control element 148 for actuating the control element and activating the brake system, under conditions as described herein.

Figure 6:
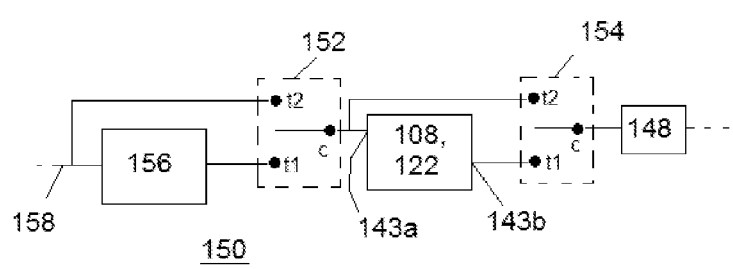
FIG. 6 is a schematic diagram of another embodiment of a system for vehicle control, with switches for mode selection.

FIG. 6 shows another embodiment of a control system 150, illustrating an example of the control system having switches for selective operational configuration (e.g., mode selection). The control system 150 includes a control module 108, 122 having an input 143a and an output 143b as described above. The control system 150 further includes first and second switches 152, 154, e.g., a first single pole, double throw (SPDT) switch 152 and a second SPDT switch 154. (The connecting lines in FIG. 6 are indicative of electrical connections, but only single lines are shown for the sake of simplicity of illustration, e.g., ground lines and other, complementary signal lines are omitted. Thus, although SPDT switches are shown, this is merely for illustration purposes, and actual implementations may have more complex switches.) The common terminal "c" of the second switch 154 is connected to the input of a brake system control element 148. A first throw terminal "t1" of the second switch is connected to the control module output 143b (output for activating the brake system), and the second throw terminal "t2" of the second switch is connected to the control module input 143a (input for receiving penalty detection system information/signals). The common terminal of the first switch 152 is also connected to the control module input 143a. A first throw terminal of the first switch 152 is connected to a control output of a penalty detection system control unit 156. (The unit 156 is part of the penalty detection system, and is configured for determining when a designated event has occurred, such as receiving a designated signal from off board, for initiating a braking application. The unit 156 may be, or be part of, a vehicle control system.) A second throw terminal of the first switch is connected to an input of the penalty detection system control unit 156, which is also connected to a signal input line 158. The signal input line is a conductor or set of conductors for inputting control or other signals to at least part of the penalty detection system. For example, the signal input line 158 may carry signals to the unit 156 which are received from off board the consist, with the signal indicating whether a penalty brake application is to be initiated. For example, the signal input line may carry a two-level voltage signal received from off board the consist (e.g., the signal generated by an off-board rail vehicle safety system and received as a cab signal over track), with a first level of the voltage signal indicating no penalty brake application and a different, second level of the voltage signal indicating a penalty brake application is to be initiated.

Figure 7A:
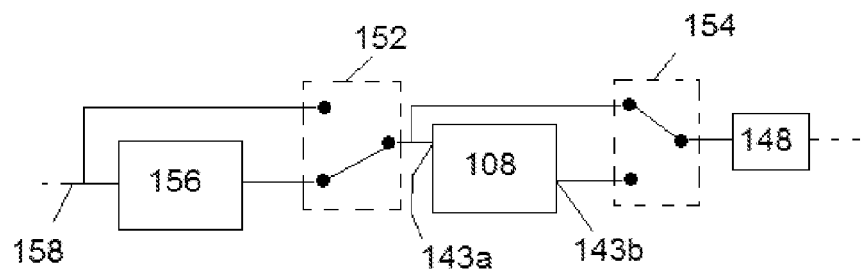
FIGS. 7A and 7B are schematic diagrams of the system of FIG. 6, as deployed on two vehicles, respectively, in a first switch configuration.
Figure 7B:
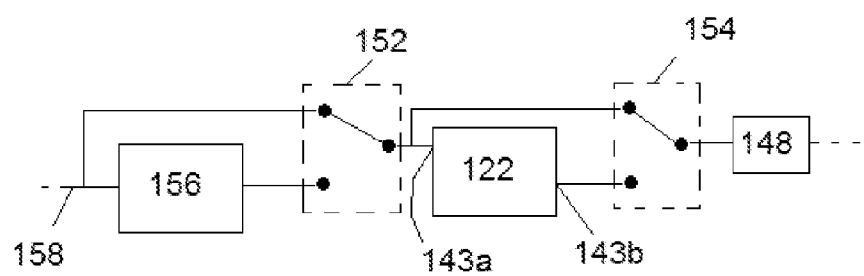

FIGS. 7A and 7B show the control system 150 on lead and trail rail vehicles, respectively, in a first configuration of the switches 152, 154. This configuration is selected for penalty control from the lead rail vehicle (FIG. 7A), where the penalty detection system (e.g., penalty detection system control unit 156) is operating normally. Thus, on the lead rail vehicle, the second switch 154 is thrown (as shown) to in effect bypass the output of the control module 108, and the first switch 152 is thrown for the penalty detection system control unit 156 to in effect be connected in series between the signal input line 158 and the brake system control element 148. On the trail rail vehicle (FIG. 7B), both the penalty detection system control unit 156 and the control module 122 are in effect bypassed.

FIGS. 8A and 8B again show the control system 150 on lead and trail rail vehicles, respectively, but in a second configuration of the switches 152, 154. This configuration is selected for penalty control from the trail rail vehicle (FIG. 8B), for example when the penalty detection system (e.g., penalty detection system control unit 156) of the lead rail vehicle is in a failure condition. Thus, the switch configuration of the switches 152, 154 is such that the control module 108 on the lead rail vehicle is operable in the first mode, and the control module 122 on the trail rail vehicle is operable in the second mode. More specifically, on the trail rail vehicle (FIG. 8B), the first switch 152 is thrown (common terminal to first throw terminal) such that the output of the penalty detection system control unit 156 is connected to the input 143a of the control module 122. The position of the second switch 154 does not matter. On the lead rail vehicle (FIG. 8A), the first switch 152 is thrown (common terminal to second throw terminal) such that the input 143a of the control module 108 is connected to the line 158. The second switch 154 is thrown (common terminal to first throw terminal) such that the output 143b of the control module 108 is connected to the brake system control element 148. Thus, on the trail rail vehicle, in operation, the switch configuration is such that the control module 122 receives the second control signal 118 from the penalty detection system control unit 156. Responsive to the signal 118, the control module communicates the first control signal 110 to the control module 108 of the lead rail vehicle (e.g., the signal 110 is communicated as network data over an MU cable bus between the vehicles). On the lead rail vehicle, in operation, the switch configuration is such that the control module 108 can activate the brake system control element 148 (by generating the third control signal 144) responsive to receiving the first control signal 110.

Figure 8A:
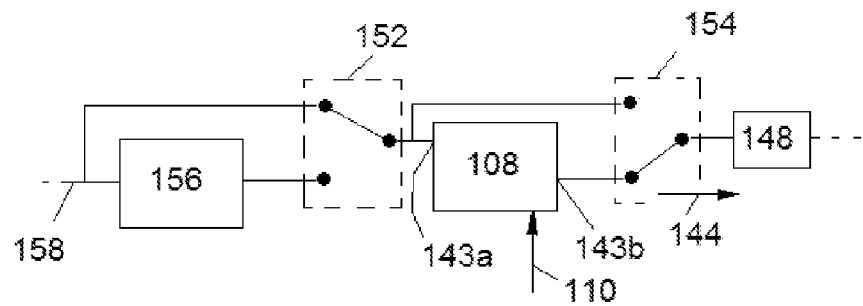
FIGS. 8A and 8B are schematic diagrams of the system of FIG. 6, as deployed on the two vehicles, respectively, in a second switch configuration.
Figure 8B:
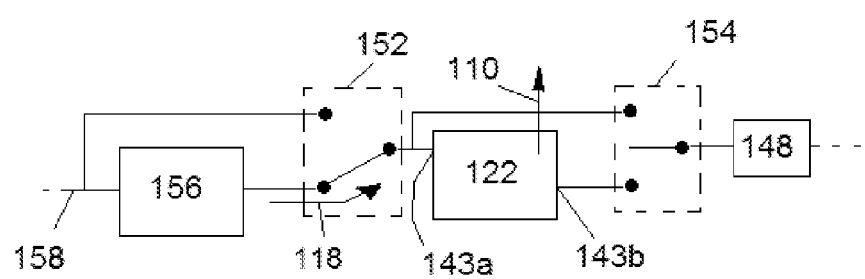

As should be appreciated, if the vehicle of FIG. 8A was instead designated as a trail rail vehicle, and the vehicle of FIG. 8B was instead designated at the lead rail vehicle, then operational modes could be selected by changing the configurations of the switches. For example, the system of FIG. 8A would be changed to reflect the configuration shown in FIG. 8B, and the system of FIG. 8B would be changed to reflect the configuration shown in FIG. 8A.

Figure 9A:
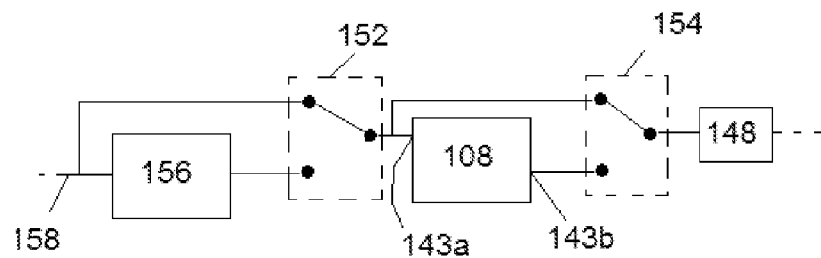
FIGS. 9A and 9B are schematic diagrams of the system of FIG. 6, as deployed on the two vehicles, respectively, in a third switch configuration.
Figure 9B:
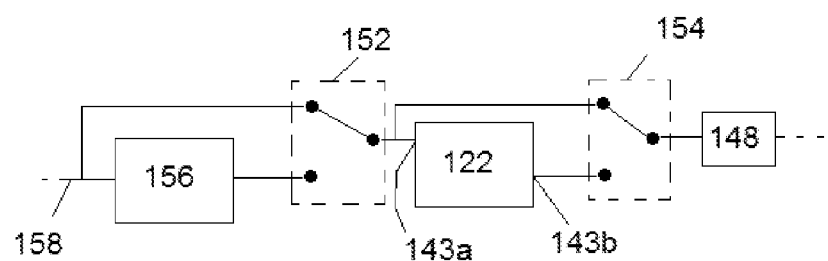

FIGS. 9A and 9B again show the control system 150 on lead and trail rail vehicles, respectively, but in a third configuration of the switches 152, 154. In this configuration, the switches 152, 154 are thrown to in effect bypass the control modules and penalty detection system control units of both the lead rail vehicle and the trail rail vehicle. In this "penalty cutout" configuration, the brake system control element 148 is directly connected to the signal input line 158, for control of the brake system control element 148 responsive to signals (e.g., designated voltage levels) on the signal input line.

Figure 10:
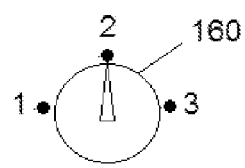
FIG. 10 shows a rotary switch portion of a system for vehicle control, according to an embodiment.

In the system 150, the switches 152, 154 may be separate, manually actuated switches. In another embodiment, with reference to FIG. 10, the switch functions are integrated into a single switch unit 160 (having multiple selectable switch configurations), such as a manually actuated rotary switch/selector as shown. In the examples shown in FIGS. 7A-7B, 8A-8B, and 9A-9B, there are in effect three possible switch configurations, namely, the configuration of FIGS. 7A and 8B, the configuration of FIGS. 7B, 9A, and 9B, and the configuration of FIG. 8A. Thus, the rotary switch 160 has three selections that correspond to the three possible configurations. The switch 160 could be outfitted with indicia for indicating which switch positions correspond to which switch configurations/system modes of operation.

Figure 11:
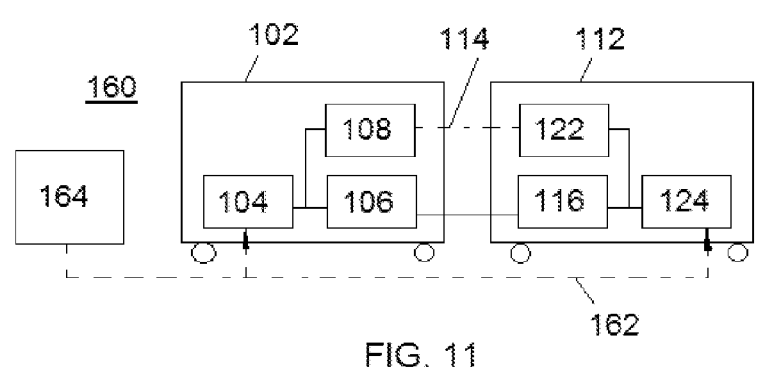
FIG. 11 is a schematic diagram of another embodiment of a system for vehicle control.

FIG. 11 shows an embodiment of a vehicle control system 160, illustrated for the example of two vehicles 102, 112 connected together in a consist. (The consist may include additional vehicles.) On each vehicle 102, 112, the control system is generally as described above, e.g., each vehicle has a penalty detection system, a brake system, and a control module. The penalty detection systems 104, 124 are configured to receive penalty brake control signals, and/or vehicle safety-related signals, and/or other control signals 162 from a source off board the consist. For example, the signals 162 may be received from a positive train control system or other off board vehicle safety system 164, as wireless radio frequency signals or other wireless signals, or as optical signals, electrical signals transmitted over track or catenary, or the like. The off board vehicle safety system 164 may be provisioned for transmitting the signals 162 according to a designated protocol, with at least one signal format of the signals 162 being designated for a penalty brake application, for initiating braking of the consist. The penalty detection systems 104, 124 of the vehicles are configured so that upon receipt of a signal 162 with the designated format (waveform) for a penalty brake application, the penalty detection systems initiate vehicle braking. Thus, as just one example, the off board vehicle safety system 164 may be configured to output a positive voltage signal for initiating a penalty brake application. (The safety system may be configured to generate such a signal if the off board vehicle safety system 164 detects that the consist has violated a signal, or is exceeding a designated speed limit, or similarly, for example.) If the penalty detection systems receive the positive voltage signal, the penalty detection systems are configured to initiate brake system activating. (The penalty detection system may be configured for different levels of braking system actuation, depending on the signals received.)

In the system 160, if the penalty detection system 104 of one of the vehicles 102 is in a failure condition, then it may not be able to receive the signals 162 and/or act responsive thereto. Thus, the second vehicle 112 "takes over" the penalty detection function for the first vehicle 102. More specifically, the first control module 108 of the first vehicle 102 is set to the first mode of operation, and the second control module 122 of the second vehicle 112 is set to the second mode of operation. If needed, the penalty detection system 124 of the second vehicle is activated for receiving the signals 162 from the off board vehicle safety system 164. In operation, the penalty detection system 124 of the second vehicle receives the signals 162. Upon receipt of a signal 162 with the designated format for a penalty or other brake application, the penalty detection system 124 outputs the second control signal 118. (Outputting the second control signal includes outputting a signal for initiating activation of the brake system, outputting a signal specifically for the control module 122, a pass-through of the signal 162, such as might be possible if the designated format for a brake application is a particular voltage level, or the like.) Responsive to the second control signal 118, the second control module 122 communicates the first control signal 110 to the first control module 108 over the communication link 114. Responsive to the first control signal 110, the first control module 108 generates the third control signal 144 for initiating activation of the brake system 106 of the first vehicle 102. (As noted, if the system is configured for different levels of braking for different designated control signals 162, then the control signals 110 may include information indicating the level of braking to be initiated, from among plural possible braking levels.)

To summarize operation of an embodiment of the control system and method, operational flow on a first vehicle in a consist may be as follows: penalty detection system fails; penalty detection system set to inactive; (air) brake system active; first control module receives penalty command from second control module; first control module sends penalty command to brake system; brake system commands penalty braking of consist. Flow on second vehicle: penalty detection system active; air brake system inactive; penalty detection system detects penalty condition; penalty detection system sends penalty command to second control module; and second control module sends penalty command to first control module.

An embodiment relates to a system, e.g., a control system. The control system comprises a first control module configured for operable coupling with at least one of a brake system of a first vehicle (e.g., a first rail vehicle) or a penalty detection system of the first vehicle. In an embodiment, the first control module is configured for operable coupling with both the brake system of the first vehicle and the penalty detection system of the first vehicle. The first control module is further configured to operate in a first mode of operation and/or a second mode of operation. In one embodiment, the first control module can be controlled for operation in the first mode, and for (non-concurrent) operation in the second mode. (Other modes of operation are possible.) In the first mode of operation, the first control module is configured to activate the brake system of the first vehicle, responsive to receiving a first control signal from a second vehicle (e.g., a second rail vehicle). The first and second vehicles are coupled in a consist. In the second mode of operation, the first control module is configured to generate the first control signal for transmission to the second vehicle and activation of a brake system of the second vehicle, responsive to receiving a second control signal from the penalty detection system.

In another embodiment of the system, the first control module operates in the first mode of operation when the first vehicle is designated for operation as a lead vehicle of the consist and when the penalty detection system of the first vehicle has failed. The first control module operates in the second mode of operation when the first vehicle is designated for operation as a trail vehicle of the consist, the second vehicle is designated as the lead vehicle of the consist, and a penalty detection system of the second vehicle has failed.

In another embodiment of the system, the brake system of the first vehicle is configured for interconnection with the brake system of the second vehicle in a common air brake system of the consist. The air brake system is configured to be actuated by the lead vehicle only. The first control module is configured to activate the brake system of the first vehicle, responsive to receiving the first control signal, as a penalty brake application of the air brake system. (That is, the brake system is activated for slowing or stopping the vehicles, for safety purposes.)

In another embodiment of the system, the first control module is configured to at least one of receive the first control signal from the second vehicle as network data or generate the first control signal for transmission to the second vehicle as network data. In another embodiment, the system further comprises a router transceiver unit on board the first vehicle. The router transceiver unit is operably coupled with an MU cable bus of the consist for communication of the network data over the MU cable bus between the first vehicle and the second vehicle.

In another embodiment of the system, when the penalty detection system is operational, the penalty detection system of the first vehicle is configured to receive information of an event from off-board the consist (e.g., the information may be embodied in an electrical signal) and to control activation of the brake system of the first vehicle responsive to the information that is received.

In another embodiment of the system, the control module is further configured, in the first mode of operation, to deactivate the brake system of the first vehicle responsive to receiving a third control signal relating to a failure condition of the penalty detection system.

In another embodiment, the system further comprises one or more switches operably coupled to the first control module and manually movable to at least two switch configurations. Operation of the first control module in the first mode of operation and in the second mode of operation is dependent upon a current switch configuration of the at least two switch configurations.

Another embodiment relates to a system, e.g., a control system. The system comprises a first control module configured for operable coupling with a first brake system of a first vehicle (e.g., a first rail vehicle) and a first penalty detection system of the first vehicle. The first control module is further configured to: operate in a first mode of operation when the first vehicle is designated as a lead vehicle of a consist comprising the first vehicle and a second vehicle (e.g., a second rail vehicle) coupled to the first vehicle and when the first penalty detection system is in a failure condition of the first penalty detection system; and to operate in a second mode of operation when the first vehicle is designated as a trail vehicle of the consist, the second vehicle is designated for operation as the lead vehicle, and a second penalty detection system of the second vehicle is in a failure condition of the second penalty detection system. In the first mode of operation, the first control module is configured to activate the first brake system of the first vehicle, responsive to receiving a first control signal from the second vehicle. In the second mode of operation, the first control module is configured to generate the first control signal for transmission to the second vehicle and activation of a second brake system of the second vehicle, responsive to receiving a second control signal from the first penalty detection system of the first vehicle.

In another embodiment of the system, the first brake system is interconnected with the second brake system in a common air brake system of the consist. The air brake system is configured to be actuated by the lead vehicle only. The first control module is configured to activate the first brake system as a penalty brake application of the air brake system.

Another embodiment relates to a system, e.g., a control system. The system comprises a first control module operably coupled with a first brake system of a first vehicle (e.g., a first rail vehicle) and a first penalty detection system of the first vehicle, and a second control module operably coupled with a second brake system of a second vehicle (e.g., a second rail vehicle) and a second penalty detection system of the second vehicle. The first and second vehicles are coupled in a consist. The first control module is configured to activate the first brake system responsive to receiving a first control signal from the second control module. The second control module is configured to transmit the first control signal to the first control module responsive to receiving a second control signal from the second penalty detection system.

In another embodiment of the system, the first vehicle is designated for operation as a lead vehicle of the consist, and the second vehicle is designated for operation as a trail vehicle of the consist. The second control module is operational to transmit the first control signal to the first control module responsive to receiving the second control signal from the second penalty detection system, when the first penalty detection system is in a failure condition.

In another embodiment of the system, the first brake system and the second brake system are interconnected in a common air brake system of the consist. The air brake system is configured to be actuated by the lead vehicle only. Activation of the first brake system by the first control module comprises a penalty brake application of the air brake system.

In another embodiment of the system, the system further comprises a first router-transceiver unit on board the first vehicle, and a second router-transceiver unit on board the second vehicle. The first control module is configured to receive the first control signal from the second control module as network data, and the second control module is configured to transmit the first control signal as the network data. The first and second router-transceiver units are operably coupled with an MU cable bus of the consist for communication of the network data over the MU cable bus between the first vehicle and the second vehicle.

Another embodiment relates to a system, e.g., a control system. The system comprises a first rail vehicle and a second rail vehicle coupled in a consist and interconnected by a common air brake system that is controlled by a designated lead rail vehicle of the consist. The system further comprises a first penalty detection system on board the first rail vehicle. The first penalty detection system is configured to activate the air brake system upon the occurrence of one or more first designated conditions and when the first rail vehicle is designated as the lead rail vehicle. The system further comprises a second penalty detection system on board the second rail vehicle. The second penalty detection system is configured to activate the air brake system upon the occurrence of one or more second designated conditions and when the second rail vehicle is designated as the lead rail vehicle. The system further comprises a first control module on board the first rail vehicle and operably coupled with the first penalty detection system and the air brake system, and a second control module on board the second rail vehicle and operably coupled with the second penalty detection system and the air brake system. The first control module is configured, when the first rail vehicle is designated as the lead rail vehicle and the first penalty detection system is in a first failure condition, to activate the air brake system responsive to receiving a first control signal from the second control module. The first control module is further configured, when the second rail vehicle is designated as the lead rail vehicle and the second penalty detection system is in a second failure condition, to transmit the first control signal to the second control module for activation of the air brake system by the second control module. The first control module is configured to transmit the first control signal responsive to receiving a second control signal from the first penalty detection system. The first penalty detection system is configured to generate the second control signal upon the occurrence of the one or more first designated conditions.

Another embodiment relates to a method for controlling a vehicle consist (e.g., a rail vehicle consist). The method comprises receiving a first control signal at a first vehicle (e.g., a first rail vehicle) from a second vehicle (e.g., a second rail vehicle) in the consist, and activating a brake system of the first vehicle responsive to the first control signal when a first penalty detection system of the first vehicle is in a failure condition.

In another embodiment, the method further comprises, prior to receiving the first control signal and activating the brake system, and responsive to the failure condition of the first penalty detection system of the first vehicle, deactivating the brake system of the first vehicle.

In another embodiment, the method further comprises transmitting the first control signal from the second vehicle to the first vehicle responsive to a second control signal received from a second penalty detection system of the second vehicle.

In another embodiment, activating the brake system of the first vehicle comprises activating a common air brake system that interconnects the first vehicle and the second vehicle.

In another embodiment, the first control signal comprises network data communicated to the first vehicle from the second vehicle over an MU cable bus interconnecting the first vehicle and the second vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the disclosed subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

The foregoing description of certain embodiments of the invention will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. "Cab signal" refers to a vehicle control signal communicated to a vehicle as an electrical signal over a track/rail on which the vehicle runs.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the appended claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a first control module configured for operable coupling with at least one of a brake system of a first vehicle or a penalty detection system of the first vehicle;
   wherein the first control module is further configured to at least one of:
      in a first mode of operation, activate the brake system of the first vehicle, responsive to receiving a first control signal from a second vehicle, the first and second vehicles being coupled in a consist; or
      in a second mode of operation, generate the first control signal for transmission to the second vehicle and activation of a brake system of the second vehicle, responsive to receiving a second control signal from the penalty detection system.

2. The system of claim 1, wherein:
   the first control module operates in the first mode of operation when the first vehicle is designated for operation as a lead vehicle of the consist and the penalty detection system of the first vehicle has failed; and
   the first control module operates in the second mode of operation when the first vehicle is designated for operation as a trail vehicle of the consist, the second vehicle is designated as the lead vehicle of the consist, and a penalty detection system of the second vehicle has failed.

3. The system of claim 2, wherein:
   the brake system of the first vehicle is configured for interconnection with the brake system of the second vehicle in a common air brake system of the consist;
   the air brake system is configured to be actuated by the lead vehicle only; and
   the first control module is configured to activate the brake system of the first vehicle, responsive to receiving the first control signal, as a penalty brake application of the air brake system.

4. The system of claim 2, wherein the first control module is configured to at least one of receive the first control signal from the second vehicle as network data or generate the first control signal for transmission to the second vehicle as network data.

5. The system of claim 4, further comprising a router transceiver unit on board the first vehicle, wherein the router transceiver unit is operably coupled with an MU cable bus of the consist for communication of the network data over the MU cable bus between the first vehicle and the second vehicle.

6. The system of claim 1, wherein the first control module is configured to at least one of receive the first control signal from the second vehicle as network data or generate the first control signal for transmission to the second vehicle as network data.

7. The system of claim 4, further comprising a router transceiver unit on board the first vehicle, wherein the router transceiver unit is operably coupled with an MU cable bus of the consist for communication of the network data over the MU cable bus between the first vehicle and the second vehicle.

8. The system of claim 1, wherein when operational, the penalty detection system of the first vehicle is configured to receive information of an event from off-board the consist and to control activation of the brake system of the first vehicle responsive to the information that is received.

9. The system of claim 8, wherein:
   the first control module operates in the first mode of operation when the first vehicle is designated for operation as a lead vehicle of the consist and the penalty detection system of the first vehicle has failed and is therefore unable to control activation of the brake system of the first vehicle responsive to the information that is received; and
   the first control module operates in the second mode of operation when the first vehicle is designated for operation as the trail vehicle of the consist, the second vehicle is designated as the lead vehicle of the consist, and a penalty detection system of the second vehicle has failed.

10. The system of claim 1, wherein the control module is further configured, in the first mode of operation, to deactivate the brake system of the first vehicle responsive to receiving a third control signal relating to a failure condition of the penalty detection system.

11. The system of claim 1, further comprising one or more switches operably coupled to the first control module and manually movable to at least two switch configurations, wherein operation of the first control module in the first mode of operation and in the second mode of operation is dependent upon a current switch configuration of the at least two switch configurations.

12. A system, comprising:
a first control module configured for operable coupling with a first brake system of a first vehicle and a first penalty detection system of the first vehicle;
wherein the first control module is further configured to: operate in a first mode of operation when the first vehicle is designated as a lead vehicle of a consist comprising the first vehicle and a second vehicle coupled to the first vehicle and when the first penalty detection system is in a failure condition of the first penalty detection system; and to operate in a second mode of operation when the first vehicle is designated as a trail vehicle of the consist, the second vehicle is designated for operation as the lead vehicle, and a second penalty detection system of the second vehicle is in a failure condition of the second penalty detection system;
wherein in the first mode of operation, the first control module is configured to activate the first brake system of the first vehicle, responsive to receiving a first control signal from the second vehicle; and
wherein in the second mode of operation, the first control module is configured to generate the first control signal for transmission to the second vehicle and activation of a second brake system of the second vehicle, responsive to receiving a second control signal from the first penalty detection system of the first vehicle.

13. The system of claim 12, wherein:
the first brake system is interconnected with the second brake system in a common air brake system of the consist;
the air brake system is configured to be actuated by the lead vehicle only; and
the first control module is configured to activate the first brake system as a penalty brake application of the air brake system.

14. A system, comprising:
a first control module operably coupled with a first brake system of a first vehicle and a first penalty detection system of the first vehicle;
a second control module operably coupled with a second brake system of a second vehicle and a second penalty detection system of the second vehicle, the first and second vehicles being coupled in a consist;
wherein the first control module is configured to activate the first brake system responsive to receiving a first control signal from the second control module; and
wherein the second control module is configured to transmit the first control signal to the first control module responsive to receiving a second control signal from the second penalty detection system.

15. The system of claim 14, wherein:
the first vehicle is designated for operation as a lead vehicle of the consist;
the second vehicle is designated for operation as a trail vehicle of the consist; and
the second control module is operational to transmit the first control signal to the first control module responsive to receiving the second control signal from the second penalty detection system, when the first penalty detection system is in a failure condition.

16. The system of claim 15, wherein
the first brake system and the second brake system are interconnected in a common air brake system of the consist;
the air brake system is configured to be actuated by the lead vehicle only; and
activation of the first brake system by the first control module comprises a penalty brake application of the air brake system.

17. The system of claim 14, further comprising:
a first router-transceiver unit on board the first vehicle; and
a second router-transceiver unit on board the second vehicle;
wherein the first control module is configured to receive the first control signal from the second control module as network data, and the second control module is configured to transmit the first control signal as the network data; and
wherein the first and second router-transceiver units are operably coupled with an MU cable bus of the consist for communication of the network data over the MU cable bus between the first vehicle and the second vehicle.

18. A system, comprising:
a first rail vehicle and a second rail vehicle coupled in a consist and interconnected by a common air brake system that is controlled by a designated lead rail vehicle of the consist;
a first penalty detection system on board the first rail vehicle, wherein the first penalty detection system is configured to activate the air brake system upon the occurrence of one or more first designated conditions and when the first rail vehicle is designated as the lead rail vehicle;
a second penalty detection system on board the second rail vehicle, wherein the second penalty detection system is configured to activate the air brake system upon the occurrence of one or more second designated conditions and when the second rail vehicle is designated as the lead rail vehicle;
a first control module on board the first rail vehicle and operably coupled with the first penalty detection system and the air brake system; and
a second control module on board the second rail vehicle and operably coupled with the second penalty detection system and the air brake system;
wherein the first control module is configured, when the first rail vehicle is designated as the lead rail vehicle and the first penalty detection system is in a first failure condition, to activate the air brake system responsive to receiving a first control signal from the second control module, and wherein the first control module is further configured, when the second rail vehicle is designated as the lead rail vehicle and the second penalty detection system is in a second failure condition, to transmit the first control signal to the second control module for activation of the air brake system by the second control module, the first control module configured to transmit the first control signal responsive to receiving a second control signal from the first penalty detection system, and wherein the first penalty detection system is configured to generate the second control signal upon the occurrence of the one or more first designated conditions.

19. A method for controlling a vehicle consist, comprising the steps of:
receiving a first control signal at a first vehicle from a second vehicle in the consist; and
activating a brake system of the first vehicle responsive to the first control signal when a first penalty detection system of the first vehicle is in a failure condition.

20. The method of claim 19, further comprising:
prior to receiving the first control signal and activating the brake system, and responsive to the failure condition of the first penalty detection system of the first vehicle, deactivating the brake system of the first vehicle.

21. The method of claim 19, further comprising:
transmitting the first control signal from the second vehicle to the first vehicle responsive to a second control signal received from a second penalty detection system of the second vehicle.

22. The method of claim 21, wherein activating the brake system of the first vehicle comprises activating a common air brake system that interconnects the first vehicle and the second vehicle.

23. The method of claim 19, wherein the first control signal comprises network data communicated to the first vehicle from the second vehicle over an MU cable bus interconnecting the first vehicle and the second vehicle.

* * * * *